Dec. 4, 1962   R. W. LOVE ET AL   3,066,507
APPARATUS FOR RESHAPING CYLINDRICAL GLASS TUBES
Filed March 1, 1960   5 Sheets-Sheet 1

Inventors:
Robert W. Love,
Michael Baranovic,
by Otto Vichy
Their Attorney.

Inventors:
Robert W. Love
Michael Baranovic
by Otto Tichy
Their Attorney

Inventors:
Robert W. Love
Michael Baranovic
by Otto Tichy
Their Attorney

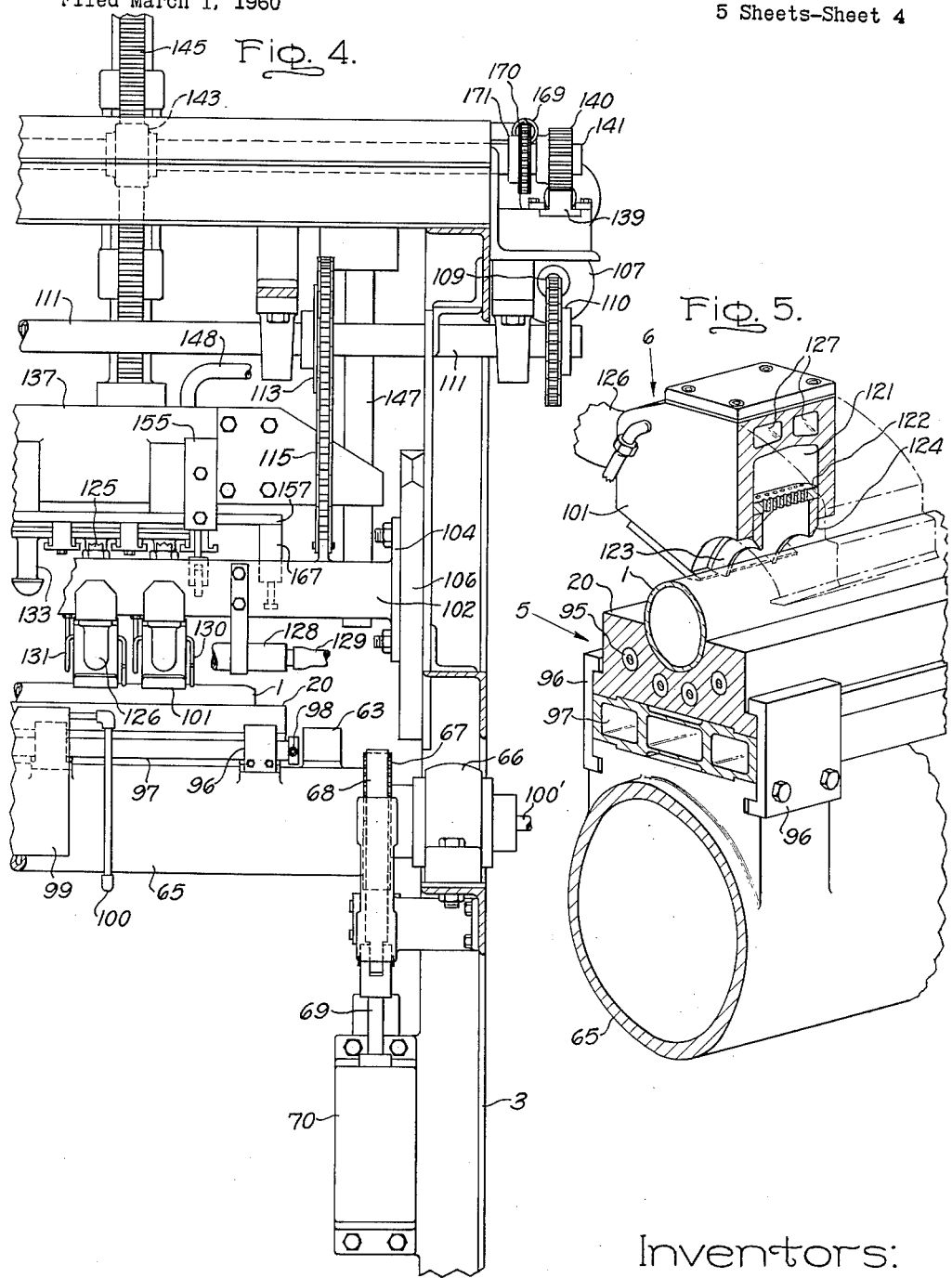

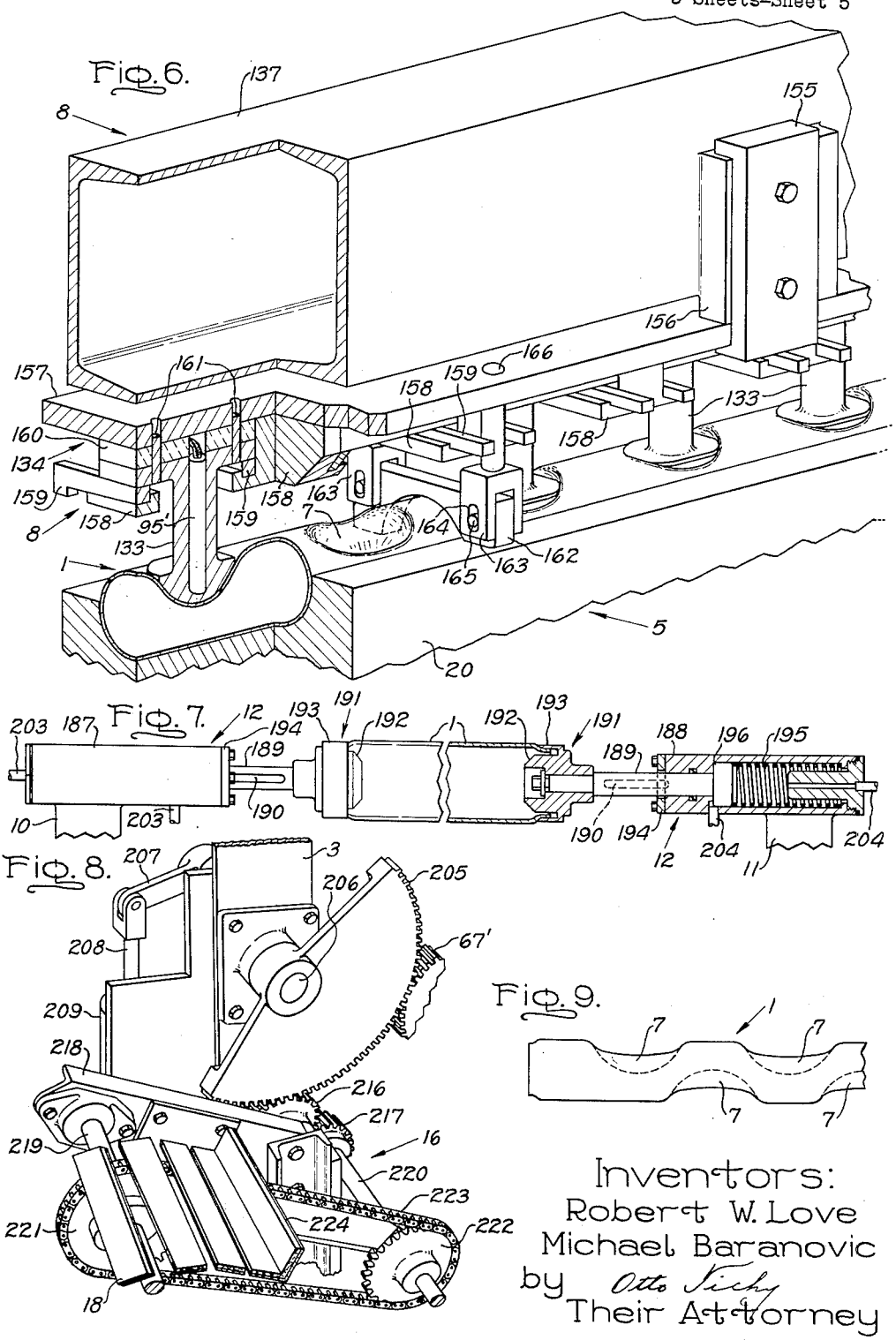

United States Patent Office 3,066,507
Patented Dec. 4, 1962

3,066,507
APPARATUS FOR RESHAPING CYLINDRICAL
GLASS TUBES
Robert W. Love, Cleveland Heights, and Michael Baranovic, Cleveland, Ohio, assignors to General Electric Company, a corporation of New York
Filed Mar. 1, 1960, Ser. No. 12,050
6 Claims. (Cl. 65—244)

The present invention relates to apparatus for reshaping hollow glass bodies and more particularly the invention relates to apparatus for reshaping elongated cylindrical gass tubes used as envelopes for evacuated electric discharge devices, such as double ended tubular fluorescent discharge lamps.

The U.S. Patent 2,916,645, patented December 8, 1959, Lemmers et al., assigned to the assignee of the present application discloses and claims an elongated vitreous envelope for an evacuated electric device of generally tubular form, for example, a fluorescent discharge lamp, having longitudinally extending transversely re-entrant groove sections spaced apart from each other along a side of the envelope and forming panels defining a discharge space within the envelope of the general cross section of a sector of an annulus. Between the groove sections the envelope has upstanding portions or ribs of generally circular cross section for strengthening the envelope against implosions. A fluorescent discharge lamp provided with such an envelope is also disclosed and claimed and a method of making the envelope together with a press bar or die plunger useful for shaping the envelope is disclosed in the above patent.

The method of making the envelope by reshaping elongated open-ended cylindrical glass tubes is disclosed and claimed in U.S. Patent No. 2,862,337, patented December 2, 1958, Shaw et al., and assigned to the assignee of the present application.

The method of making the envelope disclosed and claimed in the Shaw et al. patent comprises the steps of heating an elongated, open-ended, cylindrical glass tube blank, which has previously been provided with finished annularly reduced or shouldered end walls to adapt it for use as a fluorescent lamp envelope, to a temperature slightly below the softening temperature of the glass, heating selected separated areas along one side of the tube to a temperature at which the glass in said area is softened and becomes plastic, reshaping the tube at the separated plastic areas by folding the tube wall in said areas inwardly to form re-entrant grooves in said areas and to leave upstanding ribs between the reshaped areas or portions of the tube.

In the U.S. Patent 2,862,335, patented December 2, 1958, Shaw et al., and assigned to the assignee of the present application, a species of apparatus for automatically carrying out the steps of the method disclosed and claimed in the Shaw et al. patent to produce the lamp envelope disclosed and claimed in the Lemmers et al. patent is disclosed and claimed.

A low-pressure positive column discharge lamp having an elongated tubular thin-walled vitreous envelope provided with spaced indentations or re-entrant portions alternating on diametrically opposite sides of the envelope is disclosed and claimed in Patent 2,915,664, patented December 1, 1959, Lemmers, and assigned to the assignee of the present application.

The principal object of the present invention is to provide a species of apparatus for automatically carrying out the steps of the method of the Shaw et al. Patent No. 2,862,337 for producing the lamp envelope of the last-named Lemmers' patent by reshaping both sides of elongated, open-ended, cylindrical glass tubes blanks. Other objects and advantages of the invention will appear from the following detailed description of the apparatus, from the accompanying drawings and the appended claims.

A feature of the apparatus embodying the present invention is a mechanism which automatically transfers an elongated hollow cylindrical glass tube blank from a first press bed or mold in which the blank is seated for reshaping one side thereof to a second press bed or mold to which the blank is transferred by the transfer means for reshaping the diametrically opposite side thereof while maintaining a longitudinal orientation of the blank in the apparatus for properly locating the groove portions on opposite sides of the reshaped blank with respect to each other.

In the drawings accompanying and forming part of this specification an apparatus embodying the invention is shown, in which:

FIG. 4 is an enlarged fragmentary front elevational view of the right hand end of the machine shown in FIG. 2 with parts thereof omitted;

FIG. 5 is an enlarged perspective partly sectional view of a burner and a mold of the machine shown in FIGS. 1 to 4;

FIG. 6 is an enlarged similar view of a press die of the machine shown in the preceding figures;

FIG. 7 is an enlarged side elevational, partly sectional view of the longitudinal orienting part of the transfer mechanism;

FIG. 8 is an enlarged fragmentary perspective view of the envelope unloading mechanism of the machine.

FIG. 9 is a side elevational view of one end of a glass blank after both sides of the blank have been reshaped by the machine.

Like numbers denote like parts in all the figures.

Figure 1:
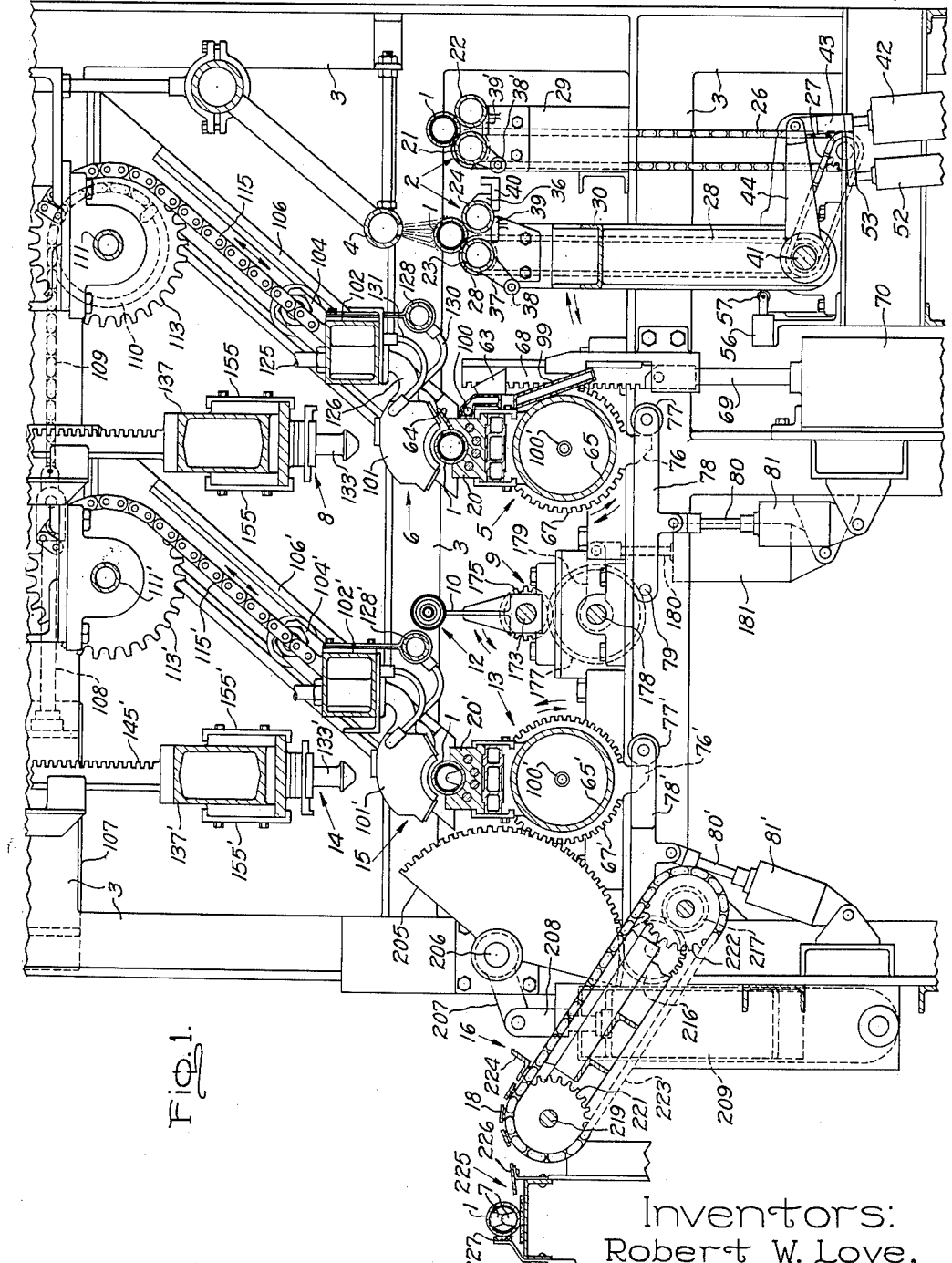
FIG. 1 is a vertical sectional view taken from front to back of the machine and showing a plurality of glass blanks therein for reshaping by the apparatus.

Referring to FIG. 1 of the drawing and starting from the front to the back of the machine, the elongated, open-ended, cylindrical glass tube blanks 1 to be reshaped are first preheated to a temperature close to but slightly below the softening temperature of the glass by the preheat assembly 2 shown at the right of FIG. 1 and mounted on the supporting frame of the machine. The various members of the machine frame are shown at 3 in the drawings. A preheated glass blank is transferred as described below from the preheat assembly 2, part of which is mounted below the fixed air-gas burner 4, to the first press bed or mold assembly 5 which is mounted for rotation on the frame 3 into a first or blank receiving position with respect to the preheat assembly 2, a second position wherein the blank is reshaped, a third position wherein the reshaped blank is unloaded from the assembly and then back to its first or blank receiving position.

Figure 2:
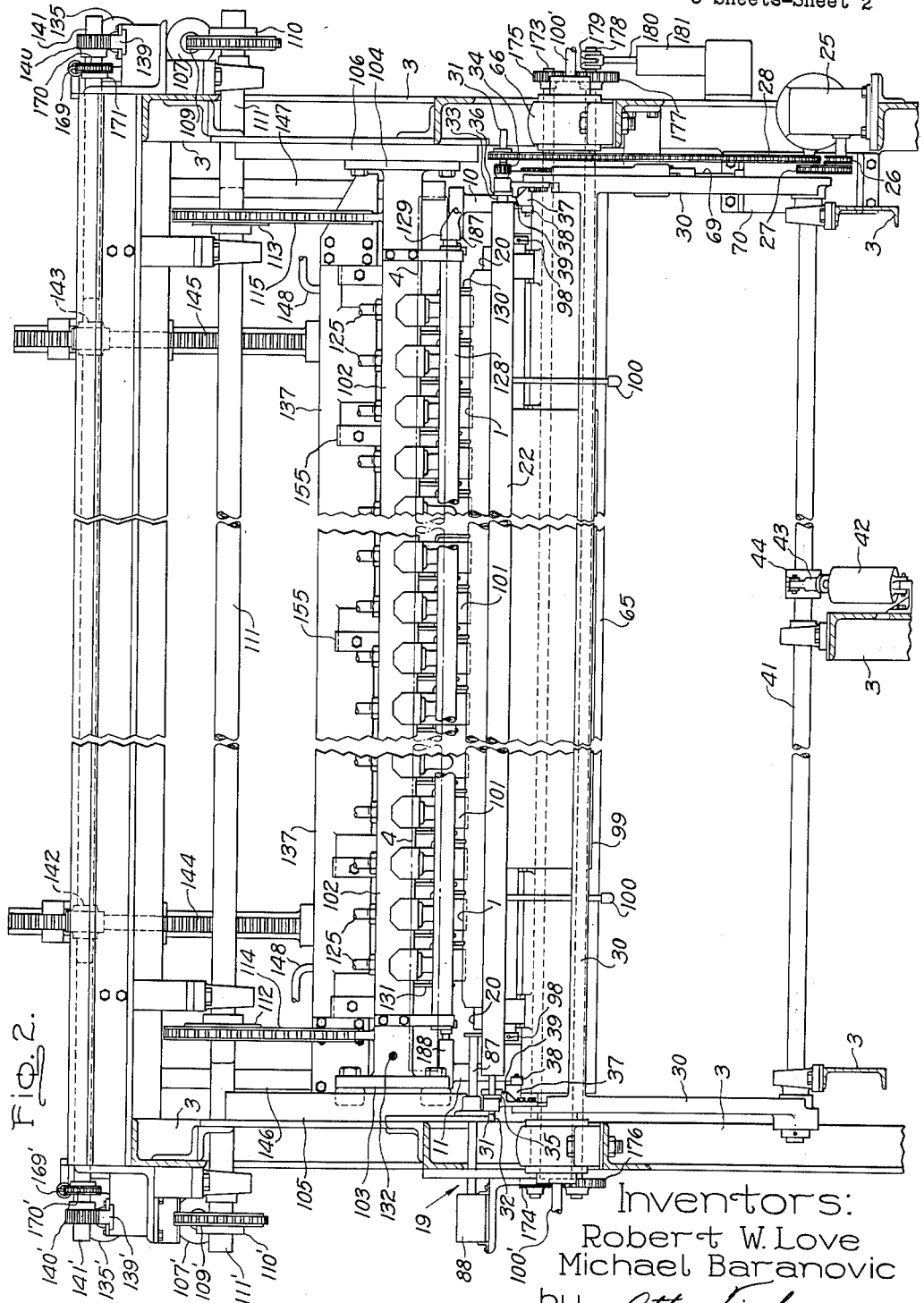
FIG. 2 is a front view of the machine shown in FIG. 1 with side portions of the machine broken therefrom and with the parts illustrated in the relative positions shown in FIG. 1.
Figure 3:
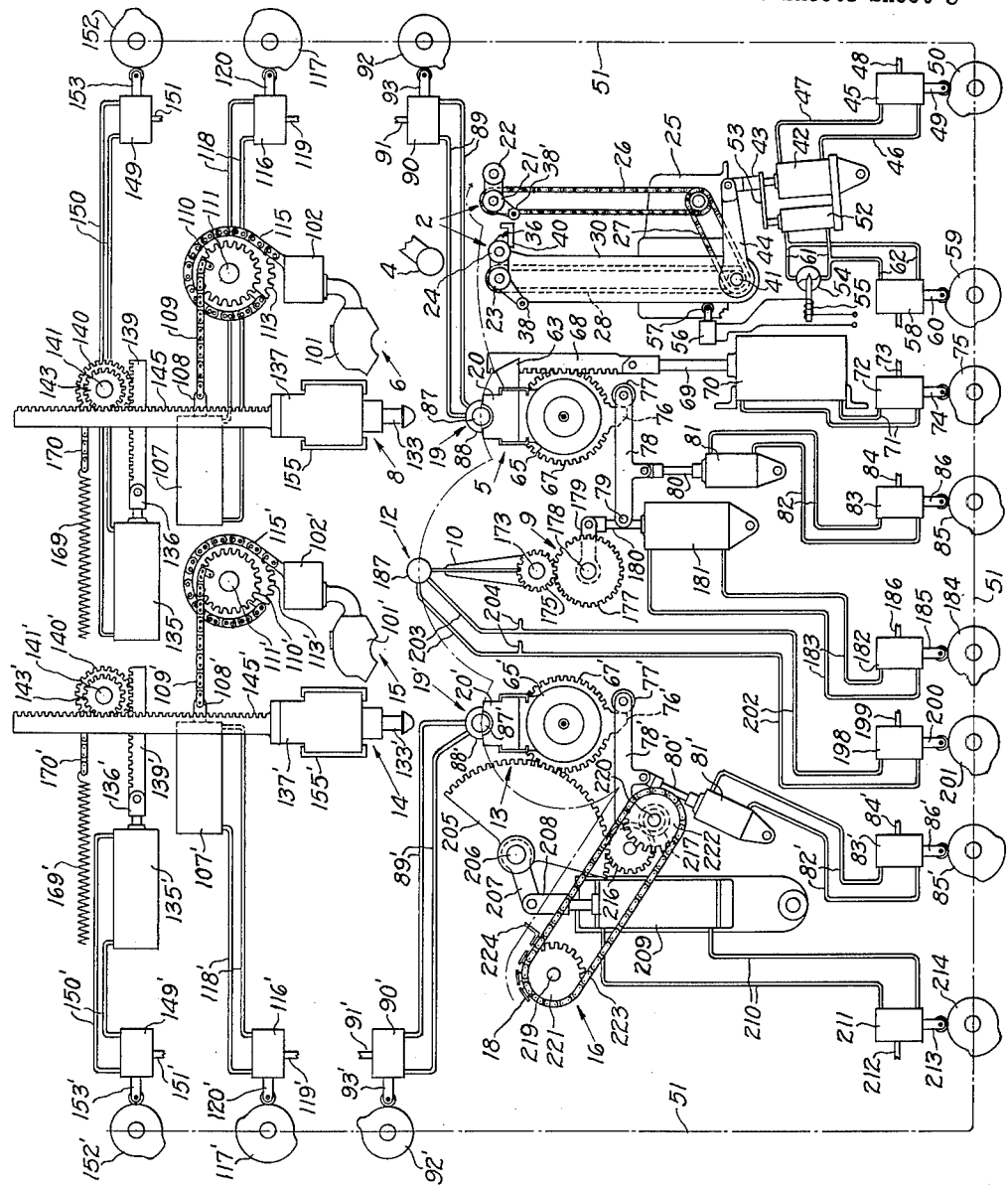
FIG. 3 is a fragmentary view, taken from the front to the back of the machine and partly schematic, of the operating elements of the machine together with the means for controlling the timing of the operating elements and the pneumatic actuating parts connected therewith.

While the mold assembly 5 is in the second of its three positions, shown in FIGS. 1 and 3 of the drawings, the upper exposed part of the blank in the assembly is heated to a plastic condition at longitudinally spaced apart portions thereof by the multiple air-gas burner assembly 6. The burner assembly 6 is mounted for reciprocation on the frame 3 between a lowered, blank heating position, shown in FIGS. 1, 2, 4 and 5, and a raised position shown in FIG. 3. The longitudinally extending transversely re-entrant groove portions 7 (FIG. 6) are formed in the plastic parts of the blank 3 immediately after the burner assembly 6 is lifted away from the heated blank. The press bar or die plunger assembly 8 mounted on the frame 3 above the mold assembly 5 forms the spaced apart re-entrant portions 7, as shown in FIG. 6. The plunger assembly 8 is mounted for reciprocation on the frame 3 between a raised position and a lowered blank engaging work position. Part of the plunger assembly 8 is shown in engagement with a blank 1 in FIG. 6. In FIGS. 1, 2, 3 and 4 of the drawings the plunger assembly 8 is shown in a partially lowered position for convenience in illustration.

After a blank has been reshaped on one side by the plunger assembly, as shown in FIG. 6, the plunger assembly 8 is lifted and the mold assembly 5 is then rotated into its third position. In this latter position the blank 1 in the assembly 5 is on the side of the assembly facing the transfer mechanism 9.

The transfer mechanism 9 is mounted on the frame 3 and is provided with a pair of swingable arms 10 and 11 equipped with means 12 (FIGS. 1 and 7) for engaging opposite ends of the partially reshaped blank and for holding the blank anti-turningly between the arms. The transfer mechanism lifts the blank out of the mold assembly 5 in the third position of the latter and places it in the second press bed or mold assembly 13 which latter assembly is then in its first or blank receiving position.

The mold assembly 13 is similar in structure to the mold assembly 5 and is similarly mounted for rotation on the frame 3 from its first or blank receiving position, to a second position (FIGS. 1 and 3), in which the opposite side of the blank is reshaped by the plunger assembly 14 after being heated by the multiple air-gas burner assembly 15 in the manner described above in connection with mold assembly 5, burner assembly 6 and plunger assembly 8. The structure and operation of the assemblies 5, 6 and 8 is duplicated in the assemblies 13, 15 and 4, respectively.

After the blank has been reshaped on its opposite side it is removed from the mold assembly 13 by rotating the latter into its third position in the direction away from the transfer mechanism 9 and toward the take-out conveyor assembly 16. The mold assembly is rotated in this direction until the blank 1 falls from the mold onto the flat platform 18 of the take-out assembly. Thereafter the mold assembly 13 is returned to its first position.

The path of travel of a blank through the machine from the preheat assembly 2 to the take-out conveyor assembly 16 is shown by dot-dash lines in FIG. 3 and the direction of the movements of the blank supporting parts of the machine is indicated by the arrows in FIG. 1.

As indicated by the dot-dash lines in FIG. 3, the mold assembly 5 is at an angle of 30° to the vertical when this assembly is in its fully rotated position toward the transfer mechanism 9, the arms 10 and 11 on the latter mechanism swing through an arc of 120° when transferring a partially reshaped blank from the mold assembly 5 to the mold assembly 13 and the mold assembly 13 is at an angle of 30° to the vertical when in its fully rotated position in the direction of the transfer mechanism 9. Thus, a blank is turned a full 180° on its longitudinal axis as it is transferred in the manner described above from the mold assembly 5 to the mold assembly 13, the transfer operation starting and ending with each of the mold assemblies 5 and 13 in their second positions in which the blank is supported directly beneath the plunger assemblies 8 and 14 in succession for reshaping.

The machine also comprises positioning means 19 mounted on the frame 3 opposite one end of the cavity of the press bed or mold 20 (FIGS. 1 to 3) of the mold assembly 5 when the latter is in its second position for properly orienting the blank longitudinally of the mold cavity with respect to the burner assembly 6 and the plunger assembly 8.

Similarly, the blank end engaging means 12 (FIGS. 1, 3 and 7) of the blank transfer mechanism 9 orients the blank with respect to the plunger assembly 14 and the burner assembly 15 when placing the blank in the cavity of the press bed or mold 20' (FIGS. 1 and 3) of the mold assembly 13 so that the grooves or indentations 7 formed by these assemblies with the mold assembly 13 in its second position are spaced in alternation with the indentations 7 (FIG. 9) already formed on the diametrically opposite side of the machine.

These operations are performed in sequence in proper time relation controlled by the components of the machine shown schematically in FIG. 3 to the end that a plurality of glass blanks 1 can be processed by the machine simultaneously and in a continuous operation.

Turning now to the blank preheat assembly 2 shown in FIGS. 1, 2 and 3, this assembly is mounted in the front of the machine and is similar in structure to that disclosed in Patent No. 2,862,335 referred to above.

The preheat assembly 2 is made up of two subassemblies both of which are shown in FIGS. 1 and 3 and the foremost of which on the machine has been omitted from FIG. 2 for clarity of illustration. Each of the subassemblies comprises a pair of spaced rollers 21 and 22, 23 and 24, respectively, with the rollers of each pair parallel to each other in a horizontal direction and spaced apart to accommodate therebetween a glass blank 1. The subassembly including the rollers 21 and 22 is affixed to the frame 3 as shown in FIG. 1 whereas the subassembly including the rollers 23 and 24 is pivotally mounted on the frame of the machine so that it can be swung into a first position whereat it receives a blank from the subassembly mounted in front of it on the machine, a second position wherein it holds and rotates a blank beneath the flames from burner 4 and a third position in which a preheated blank is delivered to the mold assembly 5, as described below.

After delivery of the preheated blank to the mold assembly 5 the subassembly including the rollers 23 and 24 is swung on its pivot from its third position directly back to its first position for receiving another blank from the subassembly including the rollers 21 and 22. The burner 4 is mounted directly above the blank supported by the subassembly including the rollers 23 and 24 in the second position of this subassembly and extends the full length of the blank. The heat from the flames of the burner 4 also serves to heat in a preliminary manner a blank supported by the subassembly having the rollers 21 and 22.

The rollers of both subassemblies of the preheat mechanism are driven at the same constant speed by the motor 25 (FIG. 2), the chain 26 driving the rollers 21 and 22 from the motor 25 and the two chains 27 and 28 driving the rollers 23 and 24 from the motor 25. In FIG. 2 part only of the chain 26 has been shown.

Except for the connections of the chain drive, described above, and the parts described below for moving the pivotally mounted subassembly having the rollers 23 and 24 into the various operative positions thereof, this subassembly and the subassembly including the rollers 21 and 22 and affixed to the frame of the machine are of the same structure. This structure is shown and described in Patent No. 2,862,335 referred to above to which reference is had for a complete description thereof.

In brief, the rollers 21 and 23 are mounted on spindles journaled in bearing blocks affixed to the support members 29 and 30, respectively. The rollers 22 and 24 are supported by spindles journaled into plates which are pivoted on the spindle supporting the rollers 21 and 23. The rollers 22 and 24 are driven at the same speed as rollers 21 and 23 by spur gears and idle gears interconnecting the rollers of each pair. The rollers 21 and 23 each are driven by a sprocket on one of their support spindles. The sprockets are engaged by the drive chains 26 and 28, respectively.

The plates pivoted on the spindles of rollers 21 and 23 are provided with arms sloping downwardly from their pivotal axis and carrying at their lower ends small rollers which are engaged by other parts of the machine described below to tilt the plates at an angle such that the blank 1 rolls by gravity over the rollers 21 and 23 and falls into a succeeding part of the machine as described below.

In FIG. 2 of the drawings, the spindles at opposite ends of the roller 23 are shown at 31, the spindles for roller 24 are shown at 32 and 33, the spur gear on spindle 33 is shown at 34, the plates pivoted on the spindles 31 are shown at 35 and 36, the arms on the plates are shown at 37 and the rollers at the ends of the arms are shown at 38. Supports for the free ends of the plate 35 and 36 are shown at 39. Omitted from FIG. 2 of the drawing, but shown in FIGS. 1 and 3, are the angle irons 40 attached to plates 35 and 36 of the subassembly having rollers 23 and 24 for engaging the rollers at the ends of the arms of the subassembly having the rollers 21 and 22.

The support or frame member 30 of the subassembly having the rollers 23 and 24 is pivoted on the frame 3 by the shaft 41 journaled in bearing blocks on the frame. The member 30 is moved around its pivot to bring the subassembly into the three positions thereof described above by the air cylinder 42 having its piston 43 connected to the shaft 41 by the lever arm 44 affixed to the shaft 41. The air cylinder 42 is connected to the air valve 45 by the conduits 46 and 47. The air valve 45 is connected by the conduit 48 to a source of air under pressure. The ports of the air valve are opened and closed by the cam follower 49 which engages the operative face of the cam 50 mounted on a shaft 51 of the machine. The air cylinder 42 is of the double direction type and air under pressure is supplied alternately to the ends of the cylinder through the valve 45 to cause the piston 43 of the air cylinder to move alternately in opposite directions. The ports of valve 45 are opened and closed to affect this operation by the cam follower 49 engaging the cam 50.

Valves and air cylinders of this type are known in the art and are available commercially. The machine comprises a plurality of such valves and cylinders and also a plurality of cams for actuating and timing the operation of the various subassemblies of the machine as described below. A detailed description and illustration of these known elements of the machine have been omitted as unnecessary for a complete understanding of the invention by those skilled in the art.

It will be understood that the control cams of this machine may be in the form of a programming timer in which switches are used to control electrical circuits to the pneumatic valving apparatus. Such a system also permits the ready use of limit switches and other interlocking overcontrols as is used in other apparatus and well known.

In FIG. 3 of the drawings and also in FIGS. 1 and 2, the subassembly having the frame 30 is shown in its second position wherein the blank 1 is rotated and supported directly beneath the flames of the burner 4. In this second position the blank 1 has been transferred from between the rollers 21 and 22 to the rollers 23 and 24 by the arm 40 engaging the roller 38' as the movable subassembly is moved from its third position back to its first position by the air cylinder 42, the valve 45 and the cam 50.

As soon as the movable subassembly has received the partially preheated blank as described above air is forced into the opposite end of the air cylinder 42 by operation of the valve 45 and the cam 50 which causes the movable subassembly to move in the opposite direction toward its second position. In order to stop and retain the movable subassembly at its second position an overriding control is provided. This control is comprised of the oil stop-check cylinder 52 connected in parallel with the air cylinder 42 by strap 53 fastened to the piston 43 of the air cylinder. The oil stop-check cylinder is controlled by a valve 54, a solenoid 55, and a switch 56. The lever arm 57 of the switch 56 is mounted in the path of movement of the support member 30 in such position that the switch 56 energizes the solenoid 55 to close the valve 54 of the stop-check cylinder 52 to arrest the swinging movement of the movable subassembly at the second position of the latter.

The movable subassembly is held in this position against the tendency of the air cylinder 42 to move it to its third position until the blank supported by the movable subassembly has been heated to a temperature close to and just below the softening temperature of the glass. After a time sufficient for the glass blank to be heated to the proper temperature the oil valve 58 which is normally closed is opened by the operation of the cam 59 which is engaged by the cam follower 60 of the oil valve 58. The solenoid actuated valve 54 thus is bypassed by the valve 58 and oil is free to flow in the stop-check cylinder 52. The subassembly is then free to move to its third position being urged thereinto by the air cylinder 42. After the preheated blank has been transferred to the subassembly 5 as described below the movable subassembly is shifted back from its third to its first position by the air cylinder 42 in which the air pressure has been reversed by the air valve 45 actuated by the cam 50. The movable subassembly then picks up another blank from the stationary subassembly in the manner described above and the operation thereof from its first to its second and its third position is repeated.

As shown in FIG. 3, the valve 54 is connected by conduits 61 to opposite ends of the oil cylinder 52 and the valve 58 is connected to opposite ends of the oil cylinder 52 by the conduit 62 communicating with respective ones of the conduit 61. The solenoid valve 54 remains in a closed position while the movable subassembly is in its second and third position and until it has been returned to its first position. As the movable subassembly is moved past its second position toward its first position, the valve 54 is open and remains open until the subassembly moves back to its second position whereupon its is closed as described above. The bypass valve 58 is opened while the movable subassembly is in its second position so that the latter can move to its third position and remains open while the movable subassembly is moved from its third to its first position and starts to move back again to its second position. The valve 58 is closed by the operation of the cam 59 before the valve 54 is closed by the operation of switch 56 so that the valve 54 is effective for stopping the movable subassembly at its second position temporarily, until released by the valve 58.

As the movable subassembly of the preheat mechanism is moved toward its third position, the mold assembly 5 is being rotated on the frame 3 toward its first or blank receiving position. As the subassemblies are moved toward their respective positions the arms 63 on the mold assembly 5 engages the rollers 38 of the movable subassembly and tilts the plates 35 and 36 so that the preheated blank falls into the cavity of the mold 20. A series of shelves 64 are provided on the mold 20 to assist in transferring the blank in this manner.

The components of the machine making up the mold 5 and for moving it into its various positions, described above, comprises a mold carrier 65 which is in the form of a hollow elongated drum the ends of which are journaled to the frame 3 as shown at 66 in FIGS. 2 and 4. The mold 20 and the arms 63 are mounted on the carrier 65 as described below. The carrier 65 is provided with a ring gear 67 at one of its ends which is engaged by rack member 68 for racking the carrier in opposite directions.

The rack member 68 is connected to the piston 69 for the air cylinder 70 which is connected by conduits 71 to the air valve 72 which in turn is connected to a source of air under pressure by conduit 73. The air valve 72 is provided with a cam follower 74 which engages the operative face of the cam 75 mounted on the shaft 51.

The arrangement of these components is such that as air is forced into one end of the cylinder 70 the carrier 65 is rotated in one direction and as air is forced into the opposite end of the air cylinder the carrier is rotated in the opposite direction. The stroke of the piston 69 is such that at one end of the stroke the mold assembly 5 is in its first position and at the opposite end of the stroke the mold assembly is in its third position. In order to arrest the mold assembly 5 at its second position as it moves from its first toward its third position, a stop is provided on the carrier 65 which is shown at 76 in FIGS. 1 and 3 of the drawing.

As the mold assembly 5 is rotated into its second position from its first position the stop 76 is engaged by the roller 77 mounted on the arm 78 pivoted as shown at 79 on the frame 3. The arm 77 is pivotally connected to the piston 80 of the air cylinder 81 which is connected by conduits 82 to the air valve 83 which is connected to the source of air under pressure by the conduit 84. The operation of the air valve 83 is controlled by the cam 85 mounted on the shaft 51 and engaged by the cam follower 86 of the valve 83.

These components of the machine are arranged in such manner that the roller 77 is in the path of movement of the stop 76 as the mold assembly is moving from its first to its second position and stops the mold assembly at its second position until released. Release of the mold assembly for movement from its second to its third position by the air cylinder 70 is effected by the air valve 83 which is moved by the cam 85 to force air into the opposite end of the air cylinder 81 to swing the arm 78 downward until the stop 76 can pass by the roller 77. As the mold assembly 5 is rotated from its third to its first position by the air cylinder 70 and its associated control apparatus, the arm 78 is moved upward again by the air cylinder 81 and its associated control apparatus after the stop 76 has passed the roller 77 in the opposite direction.

The arm 78 is held in its raised position to hold the mold assembly 5 in its second position for a time sufficient for the burner assembly 6 and the plunger assembly 8 to perform their operations on the preheated blank 1 supported in the cavity of the mold 20. After these operations have been completed the mold assembly 5 is released as described above for movement from its second to its third position.

The mold 20 in the second position of the mold assembly 5 is held with its cavity in alignment with a push-pin 87 of the blank orienting means 19 (FIGS. 2 and 3) the movements of which are controlled by the air cylinder 88 connected by conduits 89 to the air valve 90 which is connected by conduit 91 to a source of air under pressure. The valve 90 is moved into each of its two positions by the cam 92 which is engaged by the cam follower 93 of the valve 90. The stroke of the push-pin 87, which is the piston of air valve 88, is of such magnitude that when moved in one direction by the associated control and actuating mechanism described above the blank engaging end of the push-pin 87 is free of the mold cavity so that the mold assembly can be rotated past the push-pin, and when the latter is moved into its fully extended position it properly positions the blank longitudinally in the mold cavity with respect to the burner assembly 6 and the plunger assembly 8. The push-pin 87 is moved forward into its most advanced position immediately after the mold assembly 5 has been moved into its second position and is thereafter withdrawn before the air-gas burners on the burner assembly 6 are moved into heating relation to the glass blank 1 in the cavity of the mold 20.

The mold 20 is provided with continuously operating heating means in the form of sheathed electric heating elements 95 extending longitudinally through the mold and disposed so as to surround generally the cavity therein in order to maintain the part of the blank 1 in contact with the wall of the mold cavity at a temperature just below the softening temperature of the glass to which temperature the blank has been preheated, that is, a temperature of approximately 900° F., for a lime glass envelope, for example.

As shown in FIGS. 1 to 5 the mold is clamped to the carrier 65 by a plurality of clamp members 96 bolted to the carrier 65 and spaced along both sides of the mold 20. The clamp members 96 engage the mold 20, as shown in FIG. 5, in such manner as to permit the latter to expand and contract longitudinally on the carrier 65.

The carrier 65 is shielded from the heat of the mold by channel ways 97 extending between the mold 20 and the mold carrier 65 for the full length of the mold. Cooling water may be passed through the channel ways through the ports 98 provided at opposite ends of the channels as shown in FIGS. 2 and 4. The mold assembly 5 is also provided with a heat shielding member 99 (FIGS. 1, 2 and 4) on the side thereof facing the preheat assembly 2 and the burner 4 to protect this side of the assembly from the heat generated by the burner 4. The heat shield 99 is in the form of an elongated hollow member covering in part the exposed side of the mold 20 and the carrier 65. The shield 99 is provided with conduits 100 for the circulation therethrough of cooling water. The carrier 65 is also cooled by water circulated through its core through conduits 100'.

The burner assembly 6 shown in FIGS. 1 to 5 of the drawings comprises a plurality of spaced individual burners shown at 101 in the drawings and in detail in FIG. 5. The burners are adjustably secured to a carrier in the form of a hollow beam 102 having at its opposite ends two-wheeled trucks 103 and 104 the wheels of which ride on the rail members 105 and 106. The trucks are integral with the carrier beam 102 and hold the beam and the burners 101 supported thereby in a fixed angular relation to the rails 105 and 106. The rails are affixed to the frame members 3 and slope upwardly toward the front of the machine from positions opposite the end of the mold assembly 5. The rails slope upwardly at an angle to the vertical such that the burners 101 in the raised position thereof are clear of the path of plunger assembly 8 as the latter is moved first downwardly and then upwardly in a vertical direction to reshape the heated blank 1 in the mold 20. In their lowered positions the burners 101 are positioned vertically above the blank 1 in the mold 20 with the mold assembly 5 in its second position, as shown in FIG. 1 of the drawings.

The burners 101 are moved between their raised and lowered positions by the air cylinder 107. The piston 108 of which is connected to the carrier beam 102 by the chain 109 which engages the gear 110 affixed to the shaft 111 which is journaled on the frame 3 as shown in FIG. 2 of the drawings. The shaft 111 has two gears 112 and 113 at opposite ends thereof which are engaged by chains 114 and 115 respectively the ends of which are secured to the carrier beam 102. As shown in FIG. 3 the operation of the air cylinder 107 is controlled by the air valve 116 and the cam 117, the valve 116 being connected to the air cylinder 107 by conduits 118 and to a source of air under pressure by conduit 119 and the cam 117 being engaged by the cam follower 120 of the valve 116.

As the cam 117 is rotated by the cam shaft 51, the burners 101 of the burner assembly 6 are first lowered from the raised position thereof shown in FIGS. 3 to the lowered work position thereof shown in FIGS. 1, 2, 4 and 5 of the drawings, and remain in this lowered position for a time sufficient to heat the portions of the blank 1 beneath each burner 101 to a plastic condition as described above and are then lifted to the fully raised position thereof clear of the path of the plunger assembly 8. The timing of this operation is so correlated with the movement of the mold assembly 5 that the latter is in its second position when the burners 101 are in their lowered positions.

The burners 101 are adapted to heat the portions of the tube beneath each burner to a temperature of approximately 1000° C. in the case of a lime glass blank which causes the heated portion of the blank to become plastic and sag slightly downward before the plastic portions of the blank are reshaped by the plunger assembly 8.

The structure of the burners 101 is shown in detail in FIG. 5 and the conduits for supplying the air-gas mixture to the burners and the cooling water to the cooling chambers of the burners are shown in FIGS. 1 and 2. In FIG. 5 of the drawing a burner 101 is shown partly in section to show the interior thereof and the part thereof cut-away to show the interior is indicated by dot-dash lines. The burner comprises a housing defining a air-gas distribution chamber 121, a curved orifice plate 122 directing the air-gas mixture in the chamber 121 generally downward and side shields 123 and 124 mounted below the orifice plate and extending therefrom to closely surround a glass blank to confine to the cylindrical portion of the blank beneath the burner the heating effects of the jet flames issuing from the openings in the orifice plates. The heat shields 123 and 124 together with the orifice plate 122 when the burner 101 is in heating relation to a glass blank 1 constitute in effect an open bottom oven for heating a predetermined restricted semicylindrical portion of the glass blank 1 to its plastic temperature.

The conduits for supplying the air-gas mixture to the distribution chamber 121 of the burners 101 are shown at 125 (FIG. 2) and communicate with the hollow arm 126 integral with the body of the housing defining chamber 121. The arm 126 of each of the burners communicates with the chamber 121 and is adjustably bolted as shown in FIG. 1 to the support beam 102 to fasten the burners to the support beam. The burners 101 are cooled by water passageways 127 (FIG. 5) which are supplied with water from the water line 128 (FIGS. 1, 2 and 4) which is connected by conduit 129 to a source (not shown) of water under pressure and through the conduits 130 communicating with the line 128 and the water passages 127. The cooling water flows from the passages 127 of the burners 101 into the support or carrier beam 102 through the conduits 131. The carrier beam 102 is provided with an outlet port at one end thereof as shown in FIG. 2 at 132. Thus the parts of the burner assembly subjected to the heat of the flames produced by the burners are protected from warping under the heating thereof.

Immediately after the burner assembly 6 has been lifted sufficiently toward its raised position to clear the path of the plunger assembly 8 the latter is lowered to the position shown in FIG. 6 wherein the press bars or heads 133 of the die assembly 134 engage and reshape the plastic portions of the blank 1 in the mold assembly 5. As soon as the indentations or grooves 7 have been formed in the plastic wall portions of the cylindrical blank 1 the plunger assembly 8 is lifted to its fully raised position.

The plunger assembly 8 is reciprocated between its two positions by the air cylinder 135 (FIG. 3) mounted on the frame 3 having its piston 136 connected to the carrier beam 137 of the plunger assembly 8 by the rack 139 engaging the gear 140 which is affixed to the shaft 141 journaled on the frame 3 as shown in FIG. 2 and having a pair of gears 142 and 143 affixed thereto and engaging the racks 144 and 145 affixed at one end to the carrier beam 137. The carrier beam 137 is guided in its reciprocal movements by a pair of posts 146 and 147 (FIG. 2) anchored at opposite ends to the frame members 3. The carrier beam 137 is cooled by water circulated through conduits 148.

The operation of the air cylinder 135 is controlled by the air valve 149 which is connected to the air cylinder 135 by the conduits 150 and to a source of air under pressure by the conduit 151. The opening and closing of the valve 149 is controlled by the cam 152 which is engaged by a cam follower 153 of the valve 149. The cam 152 is so shaped that as it is rotated by the shaft 51 the plunger assembly 8 is first lowered and then lifted almost immediately and is normally in its raised position.

The die assembly 134 is secured to the carrier beam 137 by clamp members 155 (FIG. 6) bolted to the beam 137 as best shown in FIG. 6 and spaced along the opposite sides of the beam 137. The clamp members hold the die assembly 134 in spaced relation with respect to the beam 137 as shown at 156 in FIG. 6 to reduce the transfer of heat from the die assembly to the beam and also to permit the support plate 157 to expand. A die assembly 134 is made up of a support plate 157 for the pressing heads 133 and their insulator blocks 160, both of which are removably attached to the support plate by the hangers 158 affixed to the plate 157 and the wedges 159 inserted between the hangers and the base part or flange of the pressing heads 133. The base part of the pressing heads 133, the insulator block 160, and the support plate 157 are provided with openings accommodating dowel pins 161 which lock the pressing heads 133 against movement on the plate 157 and position the pressing heads 133 properly on the plate 157. The pressing heads 133 are individually equipped with internal electric heating elements 95' to maintain their temperature at a controlled level by means known to the art. The elements 95' are similar to elements 95 for the molds 20 and 20'.

The die assembly 134 also comprises hold-down or stripper members for restraining the blank in the mold when the plunger assembly is in the lowered position to prevent said blank from being lifted completely out of the mold when the pressing heads begin to lift from engagement with the grooved portions 7 of the blank in the event that the surface of the pressing heads 133 and the plastic portions of the blank tend to stick together. Normally this does not happen and the blank is not engaged by the hold-down members which are provided only for safety purposes in case a sticking blank is lifted by the plunger assembly.

The hold-down members comprise a curved strap 162 which is supported at each of its ends by yoke members 163 having slots 164 which are engaged by the pins 165 on the strap member. The yoke members 163 are secured to the support plate 157 as shown at 166 in the drawing. Thus the strap 162 is loosely connected to the support plate 157 and engages a sticking blank 1 shortly after the pressing heads have begun to lift.

A pair of adjustable stop members 167 (FIG. 4) secured to the support plate 157 of the die assembly 134 are provided at each end of the support plate 157 for providing a positive stop means for the plunger assembly 8. The stop members 167 engage the mold 20 to limit the stoke of the plunger assembly 8. As shown in FIG. 3 and FIG. 2, the plunger assembly 8 is counter-balanced by the spring 169 anchored at one end to the frame 3 and connected at its free end to a chain 170 which engages gear 171 (FIG. 2) affixed to the shaft 141.

The transfer mechanism 9, parts of which are shown in each of the FIGURES 1, 2, 3 and 7, comprises, in addition to the arms 10 and 11 and the means 12 mounted on the ends of the arms for engaging opposite ends of the partially reshaped blank, as described above, a shaft 173 (FIGS. 1, 2 and 3) journaled to the frame 3 and to which the arms 10 and 11 are affixed. The free ends of the arms are swung back and forth by the shaft 173 an angular distance of approximately 120° between a position in which the transfer mechanism lifts a blank 1 out of mold assembly 5 and a position wherein the transfer mechanism places a blank in mold assembly 13.

The shaft 173 is rotated to swing the arms in this manner by gears 174 and 175 affixed to opposite ends thereof, as shown in FIG. 2, which are engaged by driving gears 176 and 177 mounted on shaft 178 also journaled on the frame 3 and provided with a lever arm 179. The lever arm 179 is affixed to the shaft 178 at one end and the free end thereof is engaged by the piston 180 of the air cylinder 181. The air cylinder 181 is pivoted on the frame 3 as are other air cylinders and the operation thereof is controlled in a similar manner by the valve 182 connected thereto by conduits 183 and the cam 184 which is engaged by the cam follower 185 of the valve 182. The valve 182 is provided with air input conduit 186 connected to an air reservoir.

The swinging of the arms 10 and 11 is controlled by the cam 184 mounted on the cam shaft 51 in such manner that when the mold assembly 5 is in its third position the blank end engaging means 12 mounted on the ends of the arms 10 and 11 is in position to engage a blank in the mold 20 of the mold assembly 5. As soon as the blank engaging means 12 has engaged the ends of the blank the control mechanism swings the arms 10 and 11 in the direction toward the mold assembly 13 which is then in its first position. After the blank engaging means has released the blank the arms 10 and 11 are then swung back to an intermediate position between the mold assembly 5 and the mold assembly 13 until the mold assembly 5 is again in its third position whereupon the operation of the transfer mechanism is repeated.

When desired a stop-check mechanism such as that provided for the preheat assembly 2, or those provided for the mold assemblies 5 and 13 may be used to hold the transfer assembly 9 in its intermediate position after it has transferred the blank from one mold assembly to the other.

The means 12 for engaging the ends of a blank 1 to be transferred from one mold assembly to the other is shown in FIG. 7 and comprises two air cylinders 187 and 188 mounted on the arms 10 and 11, respectively. The piston and piston rod assemblies 189 of the air cylinders 187 and 188 each has affixed thereto a blank engaging head 191. The heads are supported in opposing positions for engaging opposite ends of the blank 1 and are of identical structure each comprising a tapered portion 192 which is inserted into the open end of a blank and a cylindrical portion 193 which accommodates the annularly reduced end portion of the blank and butts against the shoulder provided at each of the annularly reduced ends of the blank. In their fully engaged positions with respect to the ends of blank 1, the heads 191 hold the blank anti-turningly with respect thereto. The rods of the piston assemblies 189 are provided with key ways 190 which are engaged by tongues on the cylinder caps 194 which engagement prevents turning of the piston assemblies in the air cylinders 187 and 188. A blank engaged by the heads 191 thus is held anti-turningly with respect to the arms 10 and 11 of the transfer mechanism 9.

The air cylinders 187 and 188 are adapted to position the blank in a longitudinal direction in such manner with respect to the burner assembly 15 and the plunger assembly 14 that the re-entrant grooves 7 formed by the latter assembly in the blank placed in the mold 21 by the transfer mechanism 9 alternate with the grooves 7 formed in the opposite side of the blank by the plunger assembly 8 as shown in FIG. 9 and described above.

To this end the piston assembly 189 in the air cylinder 187 is so arranged that it is never extended fully in the cylinder so that the longitudinal positioning for orientation of the blank is controlled by the piston assembly 189 of the air cylinder 188. The piston of the assembly 189 of the air cylinder 188 is spring biased toward its outwardly extended position by the spring 195 which is omitted from the air cylinder 187. Thus, when air under pressure is forced into one end of the cylinders 187 and 188 to move the heads 191 into engagement with the ends of a blank 1, the air cylinder 188 exerts a greater pressure longitudinally of the blank than the air cylinder 187 due to the additional force provided by the spring 195.

A positioning face or shoulder 196 is provided in the air cylinder 188 against which the inner end of the piston rests when the piston of assembly 189 is in its fully extended position, as shown at the right of FIG. 7. The orientation of the blank with respect to the parts of the machine adapted to reshape the opposite side of the blank thus is controlled by the air cylinder 188. This cylinder is mounted on the machine behind the positioning pin 87 as shown in FIG. 2 of the drawing so that longitudinal orientation of the blank as it is moved through the machine is accomplished at the same end of the blank for maximum control.

As a check on the operation of the transfer mechanism in placing a blank in the cavity of a mold 20' in proper position for reshaping it is preferred to provide a positioning means 19' for the blank in the mold 20', the said positioning means 19' corresponding to the positioning means 19 for a blank in the mold 20. The structure and operation of the positioning means 19' is as described above in connection with the corresponding means 19 and the parts thereof corresponding to the parts of the positioning means 19 are designated by the same numbers primed.

The means controlling the operation of the air cylinders 187 and 188 is shown in FIG. 3 of the drawing and incudes the air valve 198 which is provided with the air input conduit 199 and cam follower 200 for engaging the cam 201. The air cylinders 187 and 188 are connected to the valve 198 by conduits 202 one branch of which, 203, is connected to air cylinder 187 and the other branch of which, 204, is connected to the air cylinder 188. The connections between the valve 198 and the cylinders 187 and 188 are such that the pistons 189 of the air cylinders are urged simultaneously between their advanced and remote positions with respect to the ends of blank 1.

The cam 201 and the valve 198 control the operations of the air valves 187 and 188 in such manner that the pistons 189 are moved into their blank end engaging positions with the arms 10 and 11 of the transfer mechanism stationary and juxtaposed to the mold assembly 5 and are retained in this position while the arms 10 and 11 of the transfer mechanism are swung toward the mold assembly 13. They are retracted into their remote positions after the blank has been placed in the cavity of the mold 21 of the assembly 13. The pistons 189 remain in their retracted positions until the operation is repeated to transfer a succeeding blank from one mold assembly to the other as described above.

As pointed out above, the components of the machine making up the subassembly 13 and for moving the subassembly into its various positions on the machine are similar to those of the subassembly 5. Therefore, like parts of the mold or subassembly 13 have been denoted by like numbers with the numbers applicable to the subassembly 13 primed in order to avoid repetition needless for a complete understanding of the invention. It will be noted from FIGURE 3 of the drawing that the heat shield 39 on the side of the assembly 5 facing the preheat assembly 2 and the burner 4 is not required on assembly 13. Also the means for moving the subassembly 13 between its receiving, pressing and unloading positions is different from the means for so moving the subassembly 5.

As shown in FIGS. 1, 3 and 8 means for moving the subassembly 13 comprises a segment gear 205 engaging the gear 67' on the mold carrier 65. The segment gear 205 is affixed to a short shaft 206 journaled to the frame 3. The shaft 206 has a crank 207 affixed to the end thereof opposite the end to which the segment gear 206 is affixed and the free end of the crank 207 is connected to the piston 208 of an air cylinder 209 (FIG. 3) which is adapted to move the crank 207 in a reciprocating manner to rotate the mold assembly 13. The air cylinder 209 is connected by conduits 210 to the air valve 211 which in turn is connected by conduit 212 to a source of air under pressure. The valve 211 is provided with the cam follower 213 which engages the cam 214 which controls the operation of the air cylinder 209 and the components of the machine connected to the air cylinder as described above.

Thus, the mold assembly 13 is rotated into its first or blank receiving position toward the transfer mechanism 9 and after receiving a blank in the cavity of the mold 20' is rotated into its second or work position wherein it is stopped and held by the arm 78'. After the blank is reshaped the assembly 13 is then rotated in the same direction away from the transfer mechanism 9 toward its third position in which the reshaped blank drops out of the mold 20' and falls upon the take-out assembly 16. An angular rotation of 105° from the second position of the mold assembly 13 shown in FIGS. 1 and 3 and toward the take-out assembly 16 to its third position is effective for allowing the blank to drop onto the conveyor 18 of the take-out assembly 16. Of course, the mold assembly 13 is rotated in the direction of the transfer mechanism an angular distance of 30° from the second position thereof shown in these figures. Thus, the subassembly 13 is rotated a total angular distance of 135° between its first or blank receiving and its third or blank unloading positions whereas the mold assembly 5 is rotated a total angular distance of only 60° in the operation of the machine.

The operation of the take-out assembly 16 is also controlled by the operating mechanism of the subassembly 13 as shown in FIGS. 1, 3 and 8 of the drawing in which the segment gear 205 is shown driving gears 216 and 217 of the take-out assembly.

The conveyor assembly 16 is mounted on the frame 3 in a position to receive a blank from the mold assembly 13 and comprises in addition to the gears 216 and 217 frame members 218 which are secured to the main frame 3 of the machine. The flat platform 18 is slightly longer than the blank 1 and is supported on the frame 218 by shafts 219 and 220 having sprockets two of which are shown at 221 and 222. One end only of the conveyor assembly 16 has been shown in the drawings. The shafts 219 and 220 are provided at their opposite ends (not shown) and also at spaced locations along their length with sprockets corresponding to sprockets 221 and 227.

The platform 18 of the conveyor assembly is supported by several chains engaging the sprockets on the shafts 219 and 220, one of said chains being shown at 223 in FIG. 8. The gear 217 is affixed to the shaft 220 so that the platform 18 is moved back and forth between a position wherein a blank dropped from the mold assembly 13 onto the platform 18 rests against the shelf 224 on the platform 18 and a position wherein the shelf 224 is close enough to a secondary blank receiving conveyor 225 shown at the left of FIG. 1 for the blank to roll out of the conveyor 16 onto the inclined shelf 226 and against the stop 227 of the secondary conveyor 225. The use of a flat platform 18 extending the full length of the blank received thereon is advantageous in that a blank may be unloaded from the mold assembly 13 in a semisoft condition without distorting the blank along its length because the platform 18 supports the blank along its entire length.

The burner assembly 15 and the plunger assembly 14 are identical in structure to the burner assembly 6 and the plunger assembly 8 so that further description thereof is unnecessary for a complete understanding of the invention by those skilled in the art. The actuating and control means for the burner assembly 15 and the plunger assembly 14 also are identical with those described above in connection with burner assembly 6 and plunger assembly 8 and have been designated in the drawings by the same numbers primed.

While the invention has been described with particular reference to a preferred embodiment thereof it is understood that those skilled in the art may make changes and modifications without departing from the spirit and scope of the invention as defined in the appended claims which are intended to cover all such changes and modifications.

What we claim as new and desire to secure by Letters Patent of the United States is:

1. An apparatus for reshaping cylindrical glass tube blanks to provide a plurality of re-entrant groove portions alternating on opposite sides of the blank comprising a supporting frame, two parallel spaced apart press bed assemblies adapted for supporting the blanks, each of said assemblies being mounted for rotation on the frame with its axis of rotation horizontal into a first or blank receiving position, a second position wherein a side of the blank is exposed for reshaping and a third position wherein the reshaped blank is unloaded, a transfer means having a pair of arms swung on the frame between the press bed assemblies for transferring a blank from the first to the second press bed assembly with the first press bed assembly in its unload position and the second assembly in its blank receiving position, means mounted on the free ends of said arms for engaging antiturningly opposite ends of a blank during transfer of the blank from the first to the second press bed assembly, the total angular distance traversed by the arms of the transfer means and the press bed assemblies in moving a blank from the second position of the first press bed assembly to the second position of the second press bed assembly being 180° whereby opposite sides of the blank are exposed by the press beds in their second positions, said apparatus comprising also heating means for heating to plasticity spaced apart portions on the sides of the blank exposed by the press beds in their second positions and reshaping means having groove forming protuberances for engaging the plastic portions of the blank, said heating means and said reshaping means being mounted for reciprocation on said frame between a raised position and a lowered work position with respect to a blank supported by the press beds in their second positions and actuating and timing means interconnected to reciprocate said heating means and said reshaping means in sequence with said press beds at their second positions and to move the first press bed into its unload position and the second press bed into its blank receiving position while said heating means and said reshaping means are in their raised positions and to swing the arms of the transfer mechanism from the first press bed to the second press bed while the press beds are in their unload and blank receiving positions, respectively, and means controlled by said actuating and timing means for orienting longitudinally a blank in each of the press bed assemblies with respect to the heating means and reshaping means for a blank in the respective assemblies to affect heating and reshaping portions of the blank alternating on opposite sides thereof.

2. An apparatus for reshaping cylindrical glass tube blanks to provide a plurality of re-entrant groove portions alternating on opposite sides of the blank comprising a supporting frame, two parallel spaced apart press bed assemblies adapted for supporting the blanks, each of said assemblies being mounted for rotation on the frame with its axis of rotation horizontal into a first or blank receiving position, a second position wherein a side of the blank is exposed for reshaping and a third position wherein the reshaped blank is unloaded, a transfer means having a pair of arms swung on the frame between the press bed assemblies for transferring a blank from the first to the second press bed assembly with the first press bed assembly in its unload position and the second assembly in its blank receiving position, means mounted on the free ends of said arms for engaging anti-turningly opposite ends of a blank during transfer of the blank from the first to the second press bed assembly, the total angular distance traversed by the arms of the transfer means and the press bed assemblies in moving a blank from the second position of the first press bed assembly to the second position of the second press bed assembly being 180° whereby opposite sides of the blank are exposed by the press beds in their second positions, said apparatus comprising also heating means for heating to plasticity spaced apart portions on the sides of the blank exposed by the press beds in their second positions, said heating means comprising a plurality of spaced apart downwardly directed burners each having a bottom opening for accommodating the semi-cylindrical wall portion of the blank to be heated to plasticity thereby, and reshaping means having groove forming protuberances for engaging the plastic portions of the blank, said heating means and said reshaping means being mounted for reciprocation on said frame between a raised position and a lowered work position with respect to a blank supported by the press beds in their second positions and actuating and timing means interconnected to reciprocate said heating means and said reshaping means in sequence with said press beds at their second positions and to move the first press bed into its unload position and the second press bed into its blank receiving position while said heating means and said reshaping means are in their raised positions and to swing the arms of the transfer mechanism from the first press bed to the second press bed while the press beds are in their unload and blank receiving positions, respectively, and means controlled by said actuating and timing means for orienting longitudinally a blank in each of the press bed assemblies with respect to the heating means and reshaping means for a blank in the respective assemblies to affect heating and reshaping portions of the blank alternating on opposite sides thereof.

3. An apparatus for reshaping cylindrical glass tube blanks to provide a plurality of re-entrant groove portions alternating on opposite sides of the blank comprising a supporting frame, two parallel spaced apart press bed assemblies adapted for supporting the blanks, each of said assemblies being mounted for rotation on the frame with its axis of rotation horizontal into a first or blank receiving position, a second position wherein a side of the blank is exposed for reshaping and a third position wherein the reshaped blank is unloaded, a transfer means having a pair of arms swung on the frame between the press bed assemblies for transferring an engaged blank from the first to the second press bed assembly with the first press bed assembly in its unload position and the second assembly in its blank receiving position, means mounted on the free ends of said arms for engaging antiturningly opposite ends of a blank during transfer of the blank from the first to the second press bed assembly, the total angular distance traversed by the arms of the transfer means and the press bed assemblies in moving a blank from the second position of the first press bed assembly to the second position of the second press bed assembly being 180° whereby opposite sides of the blank are exposed by the press beds in their second positions, said apparatus comprising also heating means for heating to plasticity spaced apart portions on the sides of the blank exposed by the press beds in their second positions and reshaping means having groove forming protuberances for engaging the plastic portions of the blank, said reshaping means comprising a support plate, a plurality of blank pressing heads, individual separable means securing said heads to said plate and blank hold down members secured to said plate between said heads, said heating means and said reshaping means being mounted for reciprocation on said frame between a raised position and a lowered work position with respect to a blank supported by the press beds in their second positions and actuating and timing means interconnected to reciprocate said heating means and said reshaping means in sequence with said press beds at their second positions and to move the first press bed into its unload position and the second press bed into its blank receiving position while said heating means and said reshaping means are in their raised positions and to swing the arms of the transfer mechanism from the first press bed to the second press bed while the press beds are in their unload and blank receiving positions, respectively, and means controlled by said actuating and timing means for orienting longitudinally a blank in each of the press bed assemblies with respect to the heating means and reshaping means for a blank in the respective assemblies to affect heating and reshaping portions of the blank alternating on opposite sides thereof.

4. An apparatus for reshaping cylindrical glass tube blanks to provide a plurality of re-entrant groove portions alternating on opposite sides of the blank comprising a supporting frame, two parallel spaced apart press bed assemblies adapted for supporting the blanks, each of said assemblies being mounted for rotation on the frame with its axis of rotation horizontal into a first or blank receiving position, a second position wherein a side of the blank is exposed for reshaping and a third position wherein the reshaped blank is unloaded, a transfer means having a pair of arms swung on the frame between the press bed assemblies for transferring an engaged blank from the first to the second press bed assembly with the first press bed assembly in its unload position and the second assembly in its blank receiving position, means mounted on the free ends of said arms for engaging anti-turningly opposite ends of a blank during transfer of the blank from the first to the second press bed assembly, the total angular distance traversed by the arms of the transfer means and the press bed assemblies in moving a blank from the second position of the first press bed assembly to the second position of the second press bed assembly being 180° whereby opposite sides of the blank are exposed by the press beds in their second positions, said apparatus comprising also blank preheating means for heating the entire blank to a temperature close to the temperature at which the glass of the blank is plastic, said blank preheating means comprising a carrier pivotally mounted on the frame for successive movements into blank receiving, heating and delivery positions on the side of the first press bed assembly away from the second press bed assembly, blank take out means comprising a platform mounted for movement on said frame between a blank receiving and a blank delivery position on the side of the second press bed assembly away from the first press bed assembly, segmented heating means for heating to plasticity spaced apart portions on the sides of the blank exposed by the press beds in their second positions and reshaping means having groove forming protuberances for engaging the plastic portions of the blank, said segmented heating means and said reshaping means being mounted for reciprocation on said frame between a raised position and a lowered position with respect to a blank supported by the press beds in their second positions and actuating and timing means interconnected to move the blank carrier of the preheating means into its delivery position with the first press bed in its blank receiving position, to reciprocate the segmented heating means and the reshaping means in sequence with the press beds at their second positions and to move the first press bed into its unload position and the second press bed itno its blank receiving position while said segmented heating means and said reshaping means are in their raised positions, to swing the arms of the transfer mechanism from the first press bed to the second press bed while the press beds are in their unload and blank receiving positions, respectively, to move the second press bed into its blank unload position with the platform of the take out means in its blank receiving poistion and means controlled by said actuating and timing means for orienting longitudinally a blank in each of the press bed assemblies with respect to the heating means and reshaping means for a blank in the respective assemblies to affect heating and reshaping portions of the blank alternating on opposite sides thereof.

5. An apparatus for reshaping cylindrical glass tube blanks to provide a plurality of re-entrant groove portions alternating on opposite sides of the blank comprising a supporting frame, two parallel spaced apart press bed assemblies adapted for supporting the blanks, each of said assemblies being moutned for rotation on the frame with its axis of rotation horizontal into a first or blank receiving position, a second position wherein a side of the blank is exposed for reshaping and a third position wherein the reshaped blank is unloaded, a transfer means having a pair of arms swung on the frame between the press bed assemblies for transferring a blank from the first to the second press bed assembly with the first press bed assembly in its unload position and with second assembly in its blank receiving position, means mounted on the free ends of said arms for engaging anti-turningly opposite ends of a blank during transfer of the blank from the first to the second press bed assembly, the total angular distance traversed by the arms of the transfer means and the press bed assemblies in moving a blank from the second position of the first press bed assembly to the second position of the second press bed assembly being 180° whereby opposite sides of the blank are exposed by the press beds in their second positions, said apparatus comprising also heating means for heating to plasticity spaced apart portions on the sides of the blank exposed by the press beds in their second positions and reshaping means having groove forming protuberances for engaging the plastic portions of the blank, said heating means and said reshaping means being mounted for reciprocation on said frame between a raised position and a lowered work position with respect to a blank supported by the press beds in their second positions and actuating and timing means inter-connected to reciprocate said heating means and said reshaping means in sequence with said press beds at their second positions and to move the first press bed into its unload position and the second press bed into its blank receiving position while said heating means and said reshaping means are in their raised positions and to swing the arms of the transfer mechanism from the first press bed to the second press bed while the press beds are in their unload and blank receiving positions, respectively, and means controlled by said actuating and timing means for orienting longitudinally a blank in each of the press bed assemblies with respect to the heating means and reshaping means for a blank in the respective assemblies to effect heating and reshaping portions of the blank alternating on opposite sides thereof, the orienting means for a blank in the second of said press bed assemblies comprising air cylinder mounted on the free ends of the arms of the transfer means.

6. An apparatus for reshaping cylindrical glass tube blanks to provide a plurality of re-entrant groove portions arranged in rows along the length of the tube blank with the rows of grooves spaced a predetermined angular distance from each other around the circumference of the tube comprising a supporting frame, parallel spaced apart press bed assemblies adapted for supporting the tube blanks, each of said assemblies being mounted for rotation on the frame with its axis of rotation horizontal into a first or blank receiving position, a second position wherein a side of the blank is exposed for reshaping and a third position wherein the reshaped blank is unloaded, a transfer means having a pair of arms swung on the frame between the press bed assemblies for transferring a blank from the first to the second press bed assembly with the first press bed assembly in its blank unloading position and the second assembly in its blank receiving position, means mounted on the free ends of said arms for engaging anti-turningly opposite ends of a blank during transfer of the blank from the first to the second press bed assembly, the total angular distance traversed by the arms of the transfer means and the press bed assemblies in moving a blank from the second position of the first press bed assembly to the second position of the second press bed assembly being equal to the predetermined angular distance between the rows of grooves around the circumference of the tube blank, said apparatus comprising also heating means for heating to platsicity spaced apart portions on the sides of the blank exposed by the press beds in their second positions and reshaping means having groove-forming protuberances for engaging the plastic portions of the blank, said heating means and said reshaping means being mounted for reciprocation on said frame between a raised position and a lowered work position with respect to a blank supported by the press beds in their second positions and actuating and timing means inter-connected to reciprocate said heating means and said reshaping means in sequence with the said press beds at their second positions and to move the first press bed into its unload position and the second press bed into its blank receiving position while said heating means and said reshaping means are in their raised positions and to swing the arms of the transfer means from the first press bed to the second press bed while the press beds are in their unload and blank receiving positions respectively.

References Cited in the file of this patent
UNITED STATES PATENTS

| | | |
|---|---|---|
| 2,394,115 | Snyder | Feb. 5, 1946 |
| 2,862,335 | Shaw et al. | Dec. 2, 1958 |